United States Patent

[11] 3,523,476

| [72] | Inventor | Takeo Nakagawa<br>No. 254-6 Takatsu-Shinden, Yachiyo-shi,<br>Chiba-ken, Japan |
|---|---|---|
| [21] | Appl. No. | 743,217 |
| [22] | Filed | July 8, 1968 |
| [45] | Patented | Aug. 11, 1970 |
| [32] | Priorities | July 12, 1967, |
| [33] | | Japan, |
| [31] | | No. 42/44394; |
| | | July 2, 1968, 43/45, 604 |

[54] MACHINE FOR CUTTING BOARDS
6 Claims, 4 Drawing Figs.

[52] U.S. Cl. ..................................................... 83/517,
83/562, 83/658, 83/643
[51] Int. Cl. ...................................................... B26d 7/26,
B26d 7/02
[50] Field of Search ............................................ 83/516,
517, 513, 519, 562, 461, 255, 618, 622, 643

[56] References Cited
UNITED STATES PATENTS

| 1,247,651 | 11/1917 | Evans...................... | 83/517 |
| 3,074,304 | 1/1963 | Cole........................ | 83/622X |

FOREIGN PATENTS

| 842,493 | 7/1960 | Great Britain. |

*Primary Examiner*— Andrew R. Juhasz
*Assistant Examiner*— Leon Gilden
*Attorney*—Stevens, Davis, Miller and Mosher ABSTRACT: Machine for cutting boards, such as veneer boards, comprising a base, a frame mounted on said base for forward or backward movement thereon to adjust the relative horizontal position of the frame and the base, a cutting table fixed on said base on which boards to be cut are fed, a presser plate movably supported by said frame and adapted to move downward to hold the boards on the table, an upper cutter vertically slidable along the front side surface of the presser plate and adapted to abut against the upper surface of the cutting table to cut one side of the boards on the table and a lower cutter vertically slidable along the rear side surface of the cutting table and adapted to abut against the lower surface of the presser plate to cut another side of the boards, the arrangement being such that the boards to be cut are fed on the cutting table and held in position by lowering the presser plate on the boards and then the boards are cut at the two sides thereof by lowering the upper cutter and raising the lower cutter simultaneously.

Patented Aug. 11, 1970 — 3,523,476

INVENTOR
TAKEO NAKAGAWA

BY

ATTORNEYS

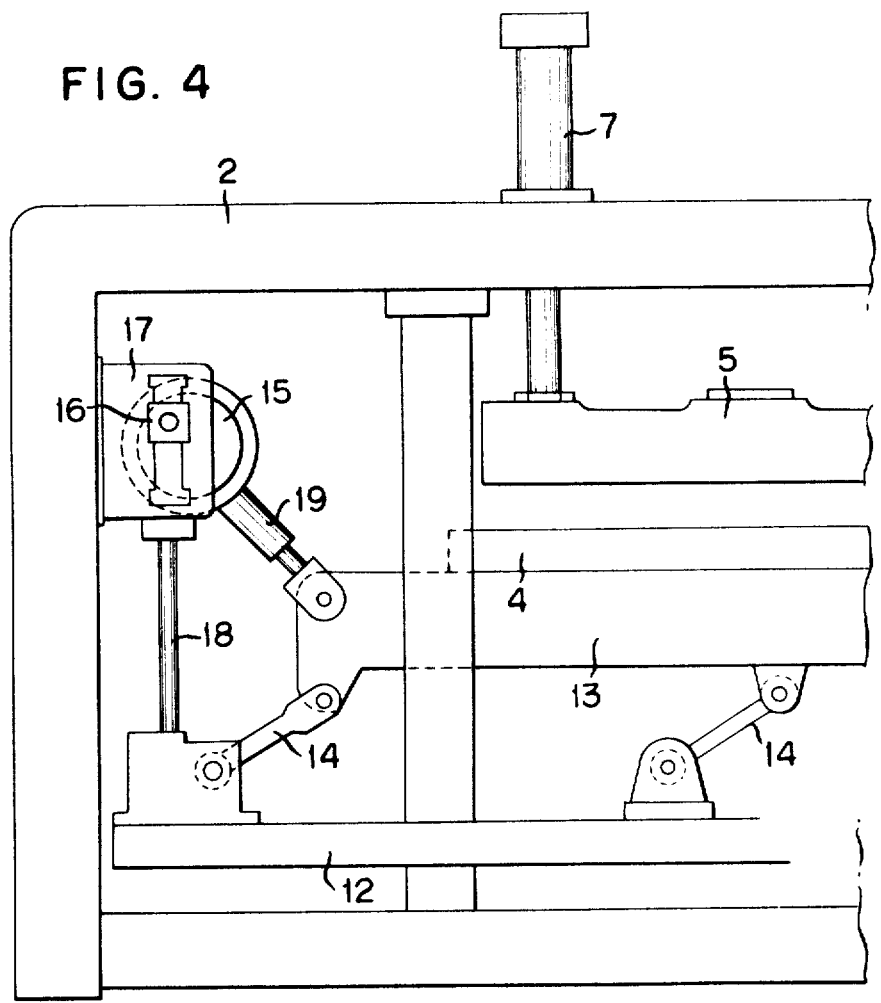
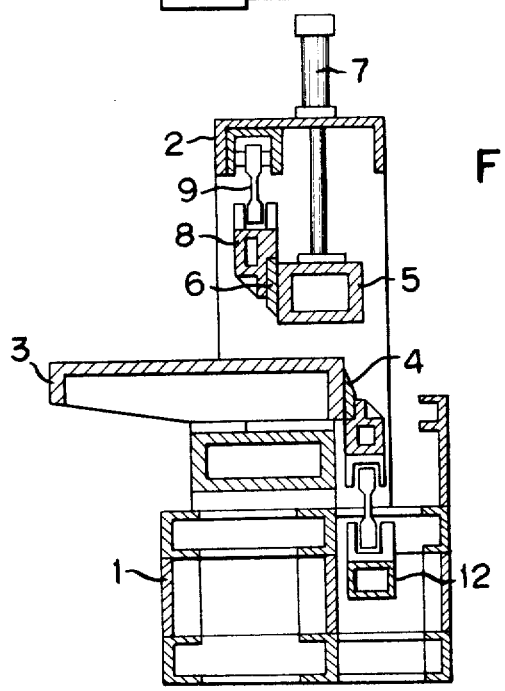

MACHINE FOR CUTTING BOARDS

BACKGROUND OF THE INVENTION

1. Field of the Invention

The present invention relates to a machine for cutting boards, such as veneer boards or the like, to a predetermined length.

2. Description of the Prior Art

Theretofore a machine for cutting boards, such as veneer boards, comprises a base, a frame fixed on the base, a cutting table fixedly mounted on the base on which boards to be cut are fed, a presser plate movably supported by said frame and adapted to move downward to hold the boards on the cutting table and a cutter movably supported by the frame and adapted to move downward to cooperate with the cutting table in order to cut the boards fed thereon. In operation, the boards are fed and fixedly held on the cutting table by the presser plate and then cut by lowering the cutter.

In such a conventional board cutting machine, the cutting of two opposite sides of the boards is accomplished by feeding the boards on the cutting table, cutting one side of the boards by the cutter, then feeding the boards a predetermined length on the table and cutting another side of the boards by the same cutter, to obtain the boards having the predetermined length.

A board cutting machine has been proposed in which a pair of cutters are provided at the front and rear sides of the presser plate in order to cut two sides of the boards simultaneously. In such a cutting machine, however, the distance between the cutters is equal to the horizontal width of the presser plate, which is constant, so that the cut length of the boards cannot be adjusted to the desired length.

SUMMARY OF THE INVENTION

It is an object of the present invention to provide a machine for cutting two opposite sides of boards simultaneously in which the cut length of the boards can be adjusted as desired.

In accordance with the present invention there is provided a machine for cutting boards comprising a base, a frame mounted on said base for forward or backward movement thereon to adjust the relative horizontal position of the frame and the base, a cutting table fixed on the base on which the boards to be cut are fed, a presser plate movably supported by said frame and adapted to move downward to hold the boards on the cutting table, an upper cutter vertically slidable along the front side surface of the presser plate and adapted to abut against the upper surface of the cutting table to cut one side of the boards thereon and a lower cutter vertically slidable along the rear side surface of the cutting table and adapted to abut against the lower surface of the presser plate to cut another side of the boards. The boards to be cut can be fixedly held on the cutting table by lowering the presser plate on the boards and then cut at the front and rear sides by lowering the upper cutter and raising the lower cutter simultaneously. The cut length of the boards can be adjusted by displacing the frame forward or backward relatively to the base to change the relative horizontal position of the presser plate and the cutting table.

In the board cutting machine according to the present invention, the upper cutter is adapted to abut against the upper surface of the cutting table to cut one side of the boards therebetween, while the lower cutter is adapted to abut against the lower surface of the presser plate to cut another side of the boards. The upper cutter can be supported by the frame so that it can move vertically relative to the frame with a constant stroke. By adjusting the stroke of the upper cutter so that the cutter abuts against the cutting table just when it has reached the lower limit of said stroke, there is no danger of the upper cutter being urged downward after it has contacted with the cutting table to cause damage of the blade nor the upper cutter being stopped before it has not reached the cutting table to cause incomplete cutting of the boards. However the lower cutter cannot be supported by the base or the cutting table so that it can move vertically relative thereto with a constant stroke, because the presser plate against which the lower cutter is adapted to abut changes its vertical position depending on the thickness of the boards held between the presser plate and the cutting table and consequently the lower cutter must change its vertical position so as to conform with the vertical position of the presser plate.

It is another object of the present invention to provide a machine for cutting boards of the above kind in which the lower cutter is supported on a movable frame which is vertically movable with the vertical movement of the presser plate, thereby obviating the above mentioned defects in the conventional board cutting machine.

BRIEF DESCRIPTION OF THE DRAWINGS

The drawings illustrate an embodiment of the present invention, in which:

FIG. 3 is a sectional view taken along the line III-III in FIG. 1; and

FIG. 4 is a rear side view shown in enlarged scale.

DESCRIPTION OF THE PREFERRED EMBODIMENT

Figure 1:
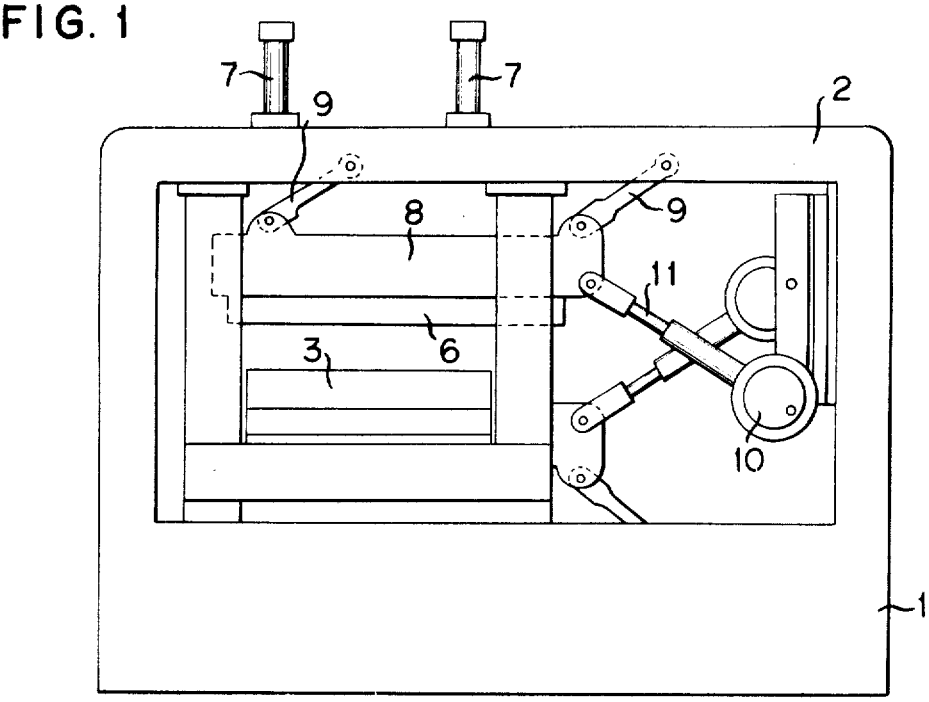
FIG. 1 is a front view of the machine according to the present invention.

Referring to the drawings, the machine for cutting boards according to the present invention comprises a base 1, a frame 2 slidable in the forward and backward direction on the base, a cutting table 3 fixed on said base, a lower cutter blade 4 vertically movable along the rear side surface of said cutting table, a presser plate 5 mounted on said frame and hydraulically actuatable in the vertical direction and an upper cutter 6 supported by said frame and vertically movable along the front side surface thereof. The presser plate 5 can be actuated by a hydraulic device 7 in the vertical direction and, during the cutting operation, it is moved downward to hold the boards on the cutting table. The cutter blade 6 is supported by a blade support 8, which is movably supported by a pair of arms 9, 9 on said frame 2 and can be driven by an eccentric cam 10 through an actuator rod 11. The frame 2 can be moved forward or backward on the base 1 to adjust the relative horizontal position of the frame and the base in order to change the horizontal distance between the upper and lower cutter blades to adjust the cut length of the boards.

Figure 2:
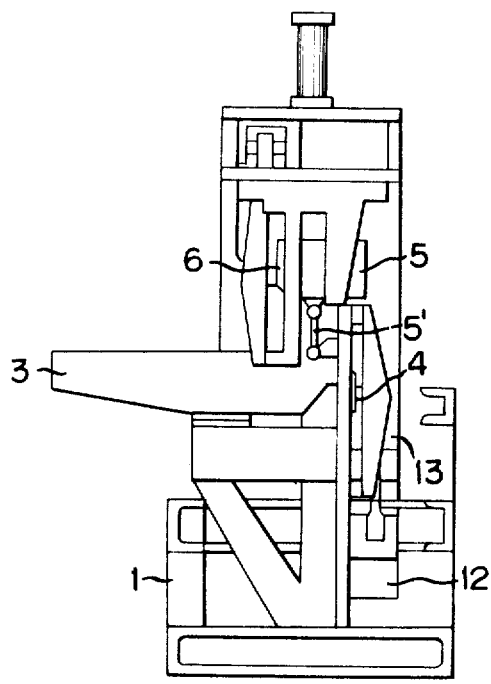
FIG. 2 is an end view seen from the right side in FIG. 1.

A movable frame 12 is provided in order to support the lower cutter blade 4 so that it can vertically move with the vertical movement of the presser plate 5. The movable frame 12 is connected with the presser plate 5 by means of a depending arm 5', as shown in FIG. 2. The lower cutter blade 4 is attached to a blade support 13, which is movably supported on the movable frame 12 by a pair of arms 14, 14 and can be driven by an eccentric cam 15. The eccentric cam 15 has a rotary shaft 16 which is vertically slidable along a guide 17 and is connected to the movable frame 12 by a connector 18 so that the eccentric cam 15 is vertically moved with the vertical movement of the frame 12. The eccentric cam is connected to the upper end of the blade support 13 by an actuator rod 19. When the rotary shaft 16 is rotated by a suitable motor, such as an electric motor, the blade support 13 is moved upward and downward at a constant stroke through the actuator rod 19 by the eccentric cam, and when the presser plate 5 is vertically moved, the movable frame 12 is moved accordingly and the shaft 16 of the eccentric cam 15 is moved along the guide 17, so that the cutter blade 4 is vertically moved with the same amount as that of the vertical movement of said presser plate 5. Consequently, the upward or downward movement of the presser plate 5 does not change the relative vertical position between the presser plate and the lower cutter blade 4, so that the latter can vertically move at the constant stroke to accomplish the cutting operation.

It will be understood from the above description that the machine according to the present invention can cut the two sides of the boards at a time. The cut length of the boards can be adjusted as desired and the boards having exact length can be produced whether the boards are repeatedly cut to the same length or they are cut to the different lengths. Thus the cutting machine according to the present invention can obtain the efficiency more than two times as that of the conventional cutting machine. The upper and lower cutter blades are adapted to exactly abut against the cutting table and the presser plate, respectively, to cut the boards therebetween, and there is no danger of the cutter blades being unduly urged against the cutting table and the presser plate to cause damages of the blades or other parts of the machine nor the cutter blades causing the incomplete cutting of the boards. Even if the thickness of the boards held between the presser plate and the cutting table is varied to cause the variation of the vertical position of the presser plate, the lower cutter blade automatically changes its vertical position so that it exactly abuts against the presser plate to accomplish exact cutting operation.

I claim:

1. A machine for cutting boards comprising a base, a frame mounted on said base for forward or backward movement thereon to adjust the relative horizontal position of the frame and the base, a cutting table fixed on said base and adapted to place boards to be cut thereon, a presser plate movably supported by said frame and adapted to move downward to hold the boards on the table, an upper cutter vertically slidable along the front side surface of the presser plate and adapted to abut against the upper surface of the cutting table to cut one side of the boards placed on the table and a lower cutter vertically slidable along the rear side surface of the cutting table and adapted to abut against the lower surface of the presser plate to cut another side of the boards.

2. A machine for cutting boards according to Claim 1, in which the upper cutter is movably supported on the frame.

3. A machine for cutting boards according to Claim 1, in which the upper cutter is driven by an eccentric cam through an actuator rod.

4. A machine for cutting boards according to Claim 1, in which the lower cutter is movably supported on a movable frame which is vertically moved with the vertical movement of the presser plate.

5. A machine for cutting boards according to Claim 4, in which the lower cutter is driven by an eccentric cam through an actuator rod.

6. A machine for cutting boards according to Claim 4, in which the eccentric cam for driving the lower cutter is supported by a guide so that it can be vertically moved along said guide with the vertical movement of the movable frame.